US007557816B2

(12) United States Patent
Kuroki

(10) Patent No.: US 7,557,816 B2
(45) Date of Patent: Jul. 7, 2009

(54) IMAGE PROCESSING APPARATUS, METHOD AND COMPUTER-READABLE STORAGE MEDIUM FOR GENERATING AND PRESENTING AN IMAGE OF VIRTUAL OBJECTS INCLUDING THE OPERATION PANEL VIEWED FROM THE POSITION AND ORIENTATION OF THE VIEWPOINT OF THE OBSERVER

(75) Inventor: Tsuyoshi Kuroki, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 11/257,838

(22) Filed: Oct. 25, 2005

(65) Prior Publication Data

US 2006/0092131 A1    May 4, 2006

(30) Foreign Application Priority Data

Oct. 28, 2004    (JP)    ............................. 2004-314715

(51) Int. Cl.
*G09G 5/14* (2006.01)

(52) U.S. Cl. ..................................... 345/633

(58) Field of Classification Search ................ 345/632, 345/633

See application file for complete search history.

(56) References Cited

U.S. PATENT DOCUMENTS

| 6,061,064 | A * | 5/2000 | Reichlen ...................... 345/418 |
| 6,515,688 | B1 * | 2/2003 | Berry et al. .................. 715/848 |
| 6,734,884 | B1 * | 5/2004 | Berry et al. .................. 715/848 |
| 6,771,294 | B1 * | 8/2004 | Pulli et al. ................... 715/863 |
| 2004/0027312 | A1 * | 2/2004 | Owada et al. ................... 345/8 |
| 2006/0241792 | A1 * | 10/2006 | Pretlove et al. ............... 700/83 |

FOREIGN PATENT DOCUMENTS

| JP | 04-214595 A | 8/1992 |
| JP | 07-271546 A | 10/1995 |

OTHER PUBLICATIONS

Poupyrev, I.; Tan, D.; Billinghurst, M.; Kato, H., Regenbrecht, H.; Tetsutani, N.; Developing a generic augmented-reality interface; Mar. 2002; Computer, IEEE,; vol. 35, Issue: 3, pp. 44-50.*

Ivan Poupyrev, Desney S Tan, Mark Billinghurst, Hirokazu Kato, Holger Regenbrecht, Nobuji Tetsutani; Tiles: A Mixed Reality Authoring Interface; 2001; Interact 2001 Conference on Human Computer Interaction, pp. 1-8.*

Machine translation of JP-07-271546 from Japanese Patent Office Website on Jul. 10, 2008 , pp. 1-39.*

* cited by examiner

*Primary Examiner*—Jeffery A Brier
(74) *Attorney, Agent, or Firm*—Canon U.S.A. Inc., I.P. Division

(57) ABSTRACT

A technology for enabling an observer to appropriately control an operation panel in accordance with a condition is provided. When an instruction for changing the position of the operation panel is input, the operation panel is disposed at the position of a pen input device. When an instruction for terminating the changing of the position of the operation panel is input, the position and orientation of the operation panel are fixed. An image of virtual objects including the operation panel viewed from a camera is generated, the generated image is superimposed on an image in a real space captured by the camera, and an image obtained by the superimposition is output to a display unit.

7 Claims, 6 Drawing Sheets

IMAGE PROCESSING APPARATUS, METHOD AND COMPUTER-READABLE STORAGE MEDIUM FOR GENERATING AND PRESENTING AN IMAGE OF VIRTUAL OBJECTS INCLUDING THE OPERATION PANEL VIEWED FROM THE POSITION AND ORIENTATION OF THE VIEWPOINT OF THE OBSERVER

BACKGROUND OF THE INVENTION

1. Field of the Invention

The present invention relates to technologies for presenting to observers images obtained by superimposing images in a virtual space upon a real space.

2. Description of the Related Art

Virtual reality (VR) systems present three-dimensional (3D) computer graphics (CG) created by computers to users who are wearing a head mount display (HMD) on their head, and thus cause the users to feel as if a virtual space were a real space.

In addition, in recent years, technologies for synthesizing 3D CG and images in the real world and for presenting to users such information that does not exist in the real world have been developed. These technologies are called augmented reality (AR) systems or mixed reality (MR) systems.

Generally, in such VR systems or AR systems, in order to control 3D CG, a drawing set for operational assistance, which is called an operation menu, is displayed on a screen and an operation is designated by inputting to the operation menu. Operation menus are categorized into a pull-down operation menu in which selecting an operation menu causes a lower operation menu to be displayed, a pop-up operation menu in which pressing a button or the like causes an operation menu to be displayed, a pi operation menu in which operation menu items are displayed in a circular pattern, and the like.

Such operation menus may be fixed and displayed in a world coordinate system, that is, in any place in a virtual space, such as a position on a virtual desk, or may be displayed in a view coordinate system, that is, may always be displayed in front of the eyes of a user (for example, see Japanese Patent Laid-Open No. 7-271546). In addition, a 3D menu can be presented to a user (for example, see Japanese Patent Laid-Open No. 4-214595). Such operation menus can be displayed on a tablet held in a user's hand.

Such display methods for operation menus have both merits and demerits. For the method for fixing an operation menu in a world coordinate system, a display area of an HMD is not occupied with the operation menu since a user sets the HMD toward the operation menu only when the user wants to use the operation menu. However, if the user moves around, the operation menu is left in an initially disposed position, and the user cannot use the operation menu when necessary.

In addition, for the method for fixing an operation menu in a view coordinate system, the operation menu follows the user even if the user moves around. However, a certain part of the display area of the HMD is always occupied with the operation menu.

In addition, for the method for displaying an operation menu on a tablet, a user's hand holding the tablet cannot be used for another purpose.

SUMMARY OF THE INVENTION

The present invention provides a technology for enabling an observer to appropriately control an operation panel in accordance with a condition.

An image processing method according to an aspect of the present invention for presenting an image in a virtual space to an observer includes: a first input step of inputting a position and an orientation of a viewpoint of the observer; a second input step of inputting a position designated by the observer; a disposing step of disposing an operation panel serving as a virtual object at the position designated by the observer in the second input step when an instruction for changing the position of the operation panel is input; and a generation step of generating an image of virtual objects including the operation panel viewed from the position and orientation of the viewpoint of the observer input in the first input step.

An image processing apparatus according to an aspect of the present invention for presenting an image in a virtual space to an observer includes: a first input unit configured to input a position and an orientation of a viewpoint of the observer; a second input unit configured to input a position designated by the observer; a disposing unit configured to dispose an operation panel serving as a virtual object at the position designated by the observer input via the second input unit when an instruction for changing the position of the operation panel is input; and a generation unit configured to generate an image of virtual objects including the operation panel viewed from the position and orientation of the viewpoint of the observer input via the first input unit.

Further features of the present invention will become apparent from the following description of exemplary embodiments with reference to the attached drawings.

DESCRIPTION OF THE EMBODIMENTS

Exemplary embodiments of the present invention will be described with reference to the drawings.

Figure 1:
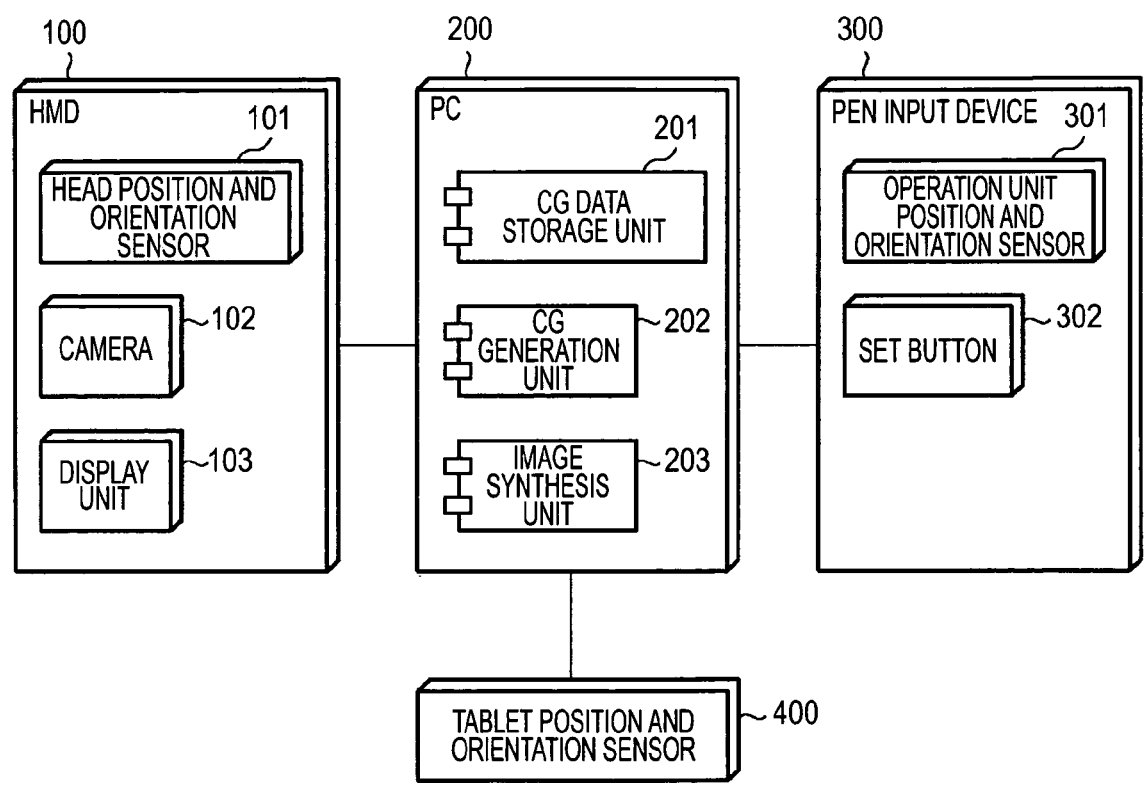
FIG. 1 is a block diagram showing the functional structure of a system according to an embodiment of the present invention.

FIG. 1 is a block diagram showing the functional structure of a system according to an embodiment of the present invention. Referring to FIG. 1, the system includes an HMD 100, a PC 200, a pen input device 300, and a tablet position and orientation sensor 400.

The HMD 100 is a head mounted display device that is worn on the head of an observer who is observing a space obtained by integrating real and virtual spaces and that provides in front of the eyes of the observer an image obtained by synthesizing the real and virtual spaces. The HMD 100 includes a head position and orientation sensor 101, a camera 102, and a display unit 103.

The head position and orientation sensor 101 detects a change in a magnetic field emanating from a transmitter (not shown), and outputs a signal indicating the detected result to the PC 200. The signal indicating the detected result represents the change in the magnetic field detected in accordance with the position and orientation of the head position and orientation sensor 101 in a coordinate system (hereinafter, referred to as a sensor coordinate system) that defines the position of the transmitter as the origin and that has x, y, and z axes, which are orthogonal to each other at the position of the origin. The PC 200 calculates the position and orientation of the head position and orientation sensor 101 in the sensor coordinate system in accordance with the signal.

The camera 102 includes, for example, one or more charge-coupled device (CCD) cameras. The camera 102 continuously captures images in a real space viewed in accordance with the position and orientation of the camera 102. The camera 102 outputs to the PC 200 a captured image for each frame. Since the camera 102 is used as the viewpoint of the observer, the camera 102 is installed in a position as near as possible to the viewpoint (eyes) of the observer when the observer is wearing the HMD 100 on his or her head.

The display unit 103 is installed on the HMD 100 at a position in front of the eyes of the observer when the observer is wearing the HMD 100 on his or her head. The display unit 103 displays an image based on an image signal output from the PC 200. Thus, an image generated by the PC 200 is provided in front of the eyes of the observer.

Although an observer is wearing an apparatus forming the HMD 100 in this embodiment, the HMD 100 is not necessarily worn by an observer as long as the observer is able to experience a space obtained by integrating virtual and real spaces.

The PC 200 includes a CG data storage unit 201, a CG generation unit 202, and an image synthesis unit 203.

The CG data storage unit 201 functions as a memory for storing data necessary for generating an image of one or more virtual objects forming a virtual space (for example, vertex data of each polygon, normal line data of each polygon, texture data, initial position data of each virtual object, and the like when a polygon forms each virtual object).

The CG generation unit 202 generates an image of a virtual object in accordance with data stored in the CG data storage unit 201.

The image synthesis unit 203 superimposes the image in the virtual space generated by the CG generation unit 202 on an image in the real space received from the camera 102 of the HMD 100, and outputs the image obtained by the superimposition to the display unit 103 of the HMD 100.

Although only a structure of the PC 200 for generating an image in a virtual space, for superimposing the image in the virtual space on an image in a real space, and for outputting the image obtained by the superimposition to the display unit 103 of the HMD 100 has been described with reference to FIG. 1, the PC 200 is actually configured to implement other functions as well.

Figure 8:
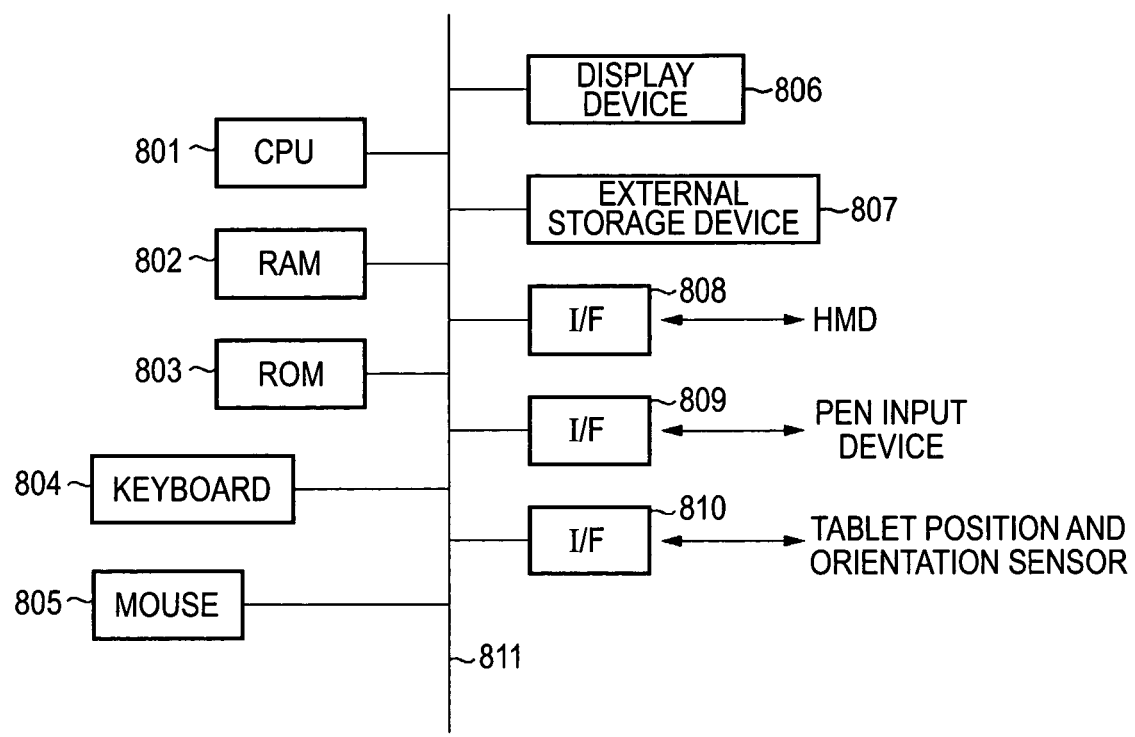
FIG. 8 is a block diagram showing the basic structure of a personal computer (PC).

FIG. 8 is a block diagram showing the basic structure of the PC 200.

A CPU 801 controls the PC 200 using a program and data stored in a random access memory (RAM) 802 and a read-only memory (ROM) 803, and performs various types of processing described below, which are performed by the PC 200. The CG generation unit 202 and the image synthesis unit 203 shown in FIG. 1 operate as parts of functions of the CPU 801.

The RAM 802 has an area for temporarily storing a program and data loaded from an external storage device 807, an area for temporarily storing data received via interfaces (I/Fs) 808 to 810, which are provided in the subsequent stages, and a work area used when the CPU 801 performs the various types of processing.

The ROM 803 stores setting data, a boot program, and the like of the PC 200.

Various instructions can be input to the CPU 801 via a keyboard 804 and a mouse 805.

A display device 806 includes a cathode-ray tube (CRT), a liquid crystal display (LCD), or the like. The display device 806 is capable of displaying a processing result of the CPU 801 using an image or a character.

The external storage device 807 includes a high-capacity information storage device, such as a hard disk drive device. An operating system (OS), a program, and data for causing the CPU 801 to perform the various types of processing described below, which are performed by the PC 200, are stored in the external storage device 807. Part or all of the OS, the program, and the data is loaded to the RAM 802 under the control of the CPU 801, and the CPU 801 uses the part or all of the OS, the program, and the data. Thus, the PC 200 performs the various types of processing described below. Here, the CG data storage unit 201 shown in FIG. 1 operates as part of functions of the external storage device 807.

The I/F 808 connects the HMD 100 to the PC 200. The PC 200 performs data communication with the HMD 100 via the I/F 808.

The I/F 809 connects the pen input device 300 to the PC 200. The PC 200 performs data communication with the pen input device 300 via the I/F 809.

The I/F 810 connects the tablet position and orientation sensor 400 to the PC 200. The PC 200 performs data communication with the tablet position and orientation sensor 400 via the I/F 810.

The units described above are connected to each other via a bus 811.

Instead of the PC 200, hardware dedicated to performing similar processing or a workstation may be used.

Referring back to FIG. 1, the pen input device 300 is described next. The pen input device 300 includes an operation unit position and orientation sensor 301 and a set button 302.

The operation unit position and orientation sensor 301 detects a change in a magnetic field emanating from a transmitter (not shown), and outputs a signal indicating the detected result to the PC 200. The signal indicating the detected result represents the change in the magnetic field detected in accordance with the position and orientation of the operation unit position and orientation sensor 301 in the sensor coordinate system. The PC 200 calculates the position and orientation of the operation unit position and orientation sensor 301 in the sensor coordinate system in accordance with the signal.

Since a virtual object to be controlled is disposed in the position and orientation of the operation unit position and orientation sensor 301, in exemplary embodiments, the operation unit position and orientation sensor 301 is mounted at a leading end of the pen input device 300. However, when the position and orientation relationship (bias) between the mounting position and the leading end is measured in advance, even if the operation unit position and orientation sensor 301 is not mounted at the leading end of the pen input device 300, the position and orientation of the leading end of the pen input device 300 can be acquired by adding the bias to the position and orientation of the operation unit position and orientation sensor 301 detected by itself. Thus, the mounting position is not particularly limited. In addition, in the description below, the term "position of the pen input device 300" represents the position of the leading end of the pen input device 300, and the position of the leading end is acquired as described above.

The set button 302 is held in an observer's hand and is used for designating timing. When the observer presses the set button 302, a signal indicating that the set button 302 is pressed is input to the PC 200.

The tablet position and orientation sensor 400 detects a change in a magnetic field emanating from a transmitter (not shown), and outputs a signal indicating the detected result to the PC 200. The signal indicating the detected result represents the change in the magnetic field detected in accordance with the position and orientation of the tablet position and orientation sensor 400 in the sensor coordinate system. The PC 200 calculates the position and orientation of the tablet position and orientation sensor 400 in the sensor coordinate system in accordance with the signal. The tablet position and orientation sensor 400 is mounted on a tablet 254, which will be described below, and measures the position and orientation of the tablet 254.

A process performed by the system according to this embodiment having the foregoing structure is described next. This process is performed for presenting an image in a space obtained by integrating real and virtual spaces to an observer who is wearing the HMD 100 on his or her head.

The camera 102 of the HMD 100 captures an image in a real space viewed by the camera 102 in accordance with the position and orientation of the camera 102, and outputs the captured image as data to the RAM 802 via the I/F 808.

The head position and orientation sensor 101 outputs a signal as data corresponding to the position and orientation of the head position and orientation sensor 101 in the sensor coordinate system to the RAM 802 via the I/F 808, as described above. The CPU 801 calculates the "position and orientation of the camera 102 in the sensor coordinate system" by adding the "position and orientation relationship between the head position and orientation sensor 101 and the camera 102" measured in advance to the data representing the "position and orientation of the head position and orientation sensor 101 in the sensor coordinate system". The data representing the "position and orientation relationship between the head position and orientation sensor 101 and the camera 102" measured in advance is stored in the external storage device 807 in advance.

Using data of each virtual object forming a virtual space stored in the external storage device 807, the CPU 801 disposes the virtual object in the virtual space. Then, in accordance with the acquired "position and orientation of the camera 102 in the sensor coordinate system", the CPU 801 generates an image in the virtual space viewed from the camera 102. Since processing for generating an image in a virtual space viewed from a point having predetermined position and orientation is well known, an explanation of the processing is omitted here.

Then, the generated image in the virtual space is superimposed on the image in the real space stored in the RAM 802, and the image obtained by the superimposition is output to the display unit 103 of the HMD 100 via the I/F 808. Accordingly, an image in a space obtained by integrating the real and virtual spaces is displayed on a display screen of the display unit 103. Thus, the observer is able to see an image corresponding to the position and orientation of the camera 102.

Various series of processing for generating an image in a space obtained by integrating real and virtual spaces and for presenting the generated image to an observer are possible, and such processing is not necessarily limited to the processing described above.

Figure 2:
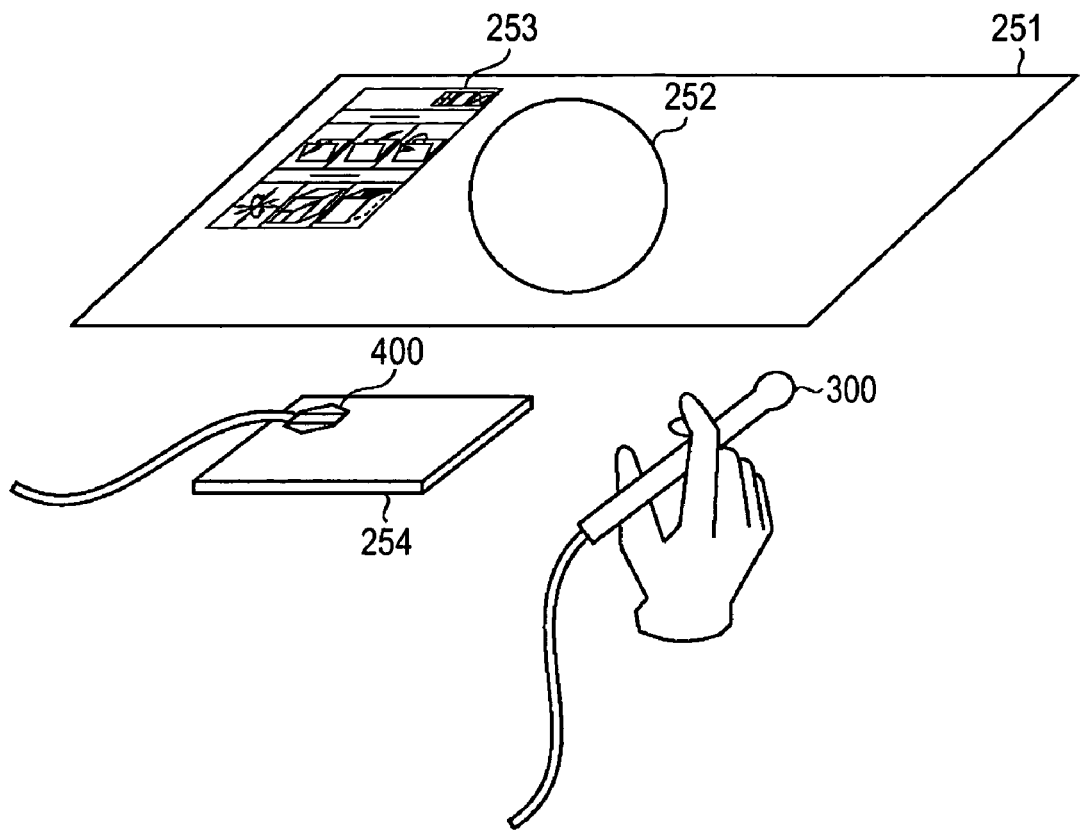
FIG. 2 shows a display example of an image displayed on a display unit when an observer is wearing an HMD on his or her head.

FIG. 2 shows an example of an image displayed on the display unit 103 when the observer is wearing the HMD 100 on his or her head.

Referring to FIG. 2, a table 251 is a real object provided to be used for performing an operation described below. In addition, a virtual object 252, an operation panel 253 as a virtual object, and the tablet 254 are provided. In FIG. 2, parts that are also shown in FIG. 1 are referred to with the same reference numerals in FIG. 2 as in FIG. 1, and the descriptions of those same parts will not be repeated here.

In this embodiment, as shown in FIG. 2, the observer holds the pen input device 300 in one hand and is able to change the position and orientation of the pen input device 300 in a desired manner. In addition, the operation panel (operation menu) 253 serving as a virtual object is disposed at a predetermined position in the virtual space.

Figure 3:
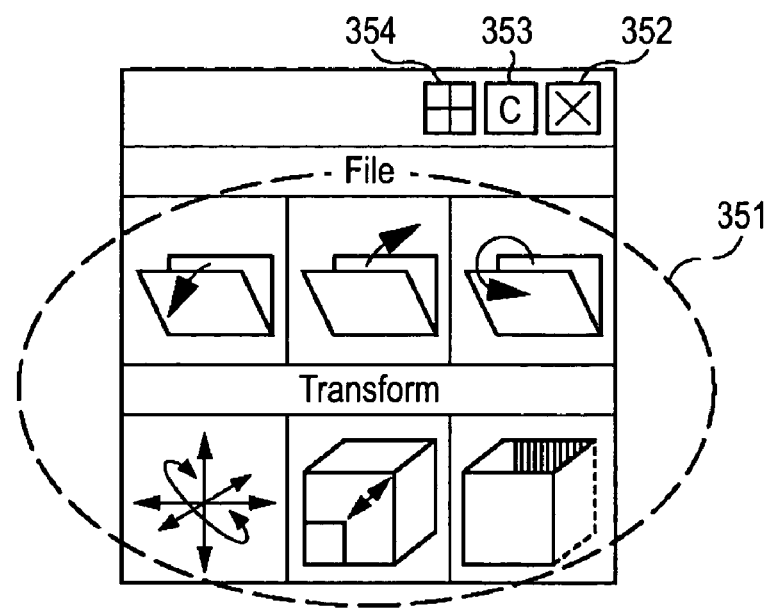
FIG. 3 shows an example of an operation panel.

FIG. 3 shows an example of the operation panel 253. As shown in FIG. 3, the operation panel 253 includes a plurality of operation icons 351. The observer is able to designate an icon using the pen input device 300. "Designating an icon" means pressing the set button 302 when the pen input device 300 is located within a display area of the icon.

When the observer designates an icon, the PC 200 implements a function corresponding to the designated icon, such as a function to move a virtual object. When the observer changes the position and orientation of the pen input device 300 by moving the observer's hand, the PC 200 changes the position and orientation of the virtual object so as to follow the change of the position and orientation of the pen input device 300. Accordingly, with an icon provided on the operation panel 253, various operations for a virtual space can be realized.

In addition, when a delete button 352 is designated, the operation panel 253 is deleted (not displayed).

When a copy button 353 is designated, the operation panel 253 is duplicated. In addition, the duplicated operation panel is disposed at a position designated by the observer.

When a move button 354 is designated, the position of the operation panel 253 can be changed. Each button can be designated by pressing the set button 302 when the pen input device 300 is located in the display area of the corresponding button.

An operation of the operation panel 253 for changing the position of the operation panel 253 is described next.

The observer holds the pen input device 300 in one hand. The observer moves the leading end of the pen input device 300 to the position of the move button 354 or the position of the copy button 353, and presses the set button 302. The PC 200 determines whether the position of the pen input device 300 (the position measured by the operation unit position and orientation sensor 301 or the position obtained by adding the bias described above to the measured position) is equal to the position of the move button 354 or the position of the copy button 353, and determines that "the move button 354 is designated" or that "the copy button 353 is designated" since the PC 200 receives a signal indicating that the set button 302 is pressed via the I/F 809.

If the move button 354 is designated, the operation panel 253 is to be moved by the pen input device 300. If the copy button 353 is designated, a virtual object of the operation panel 253 is duplicated, and the duplicated operation panel is to be moved by the pen input device 300.

When the observer moves the pen input device 300 to a specified position and presses the set button 302, the PC 200 disposes the operation panel 253 (including the duplicated operation panel) at the position of the pen input device 300 at this time (the position measured by the operation unit position and orientation sensor 301 or the position obtained by adding the bias to the measured position). Processing for such disposition is described next with reference to FIG. 4.

Figure 4:
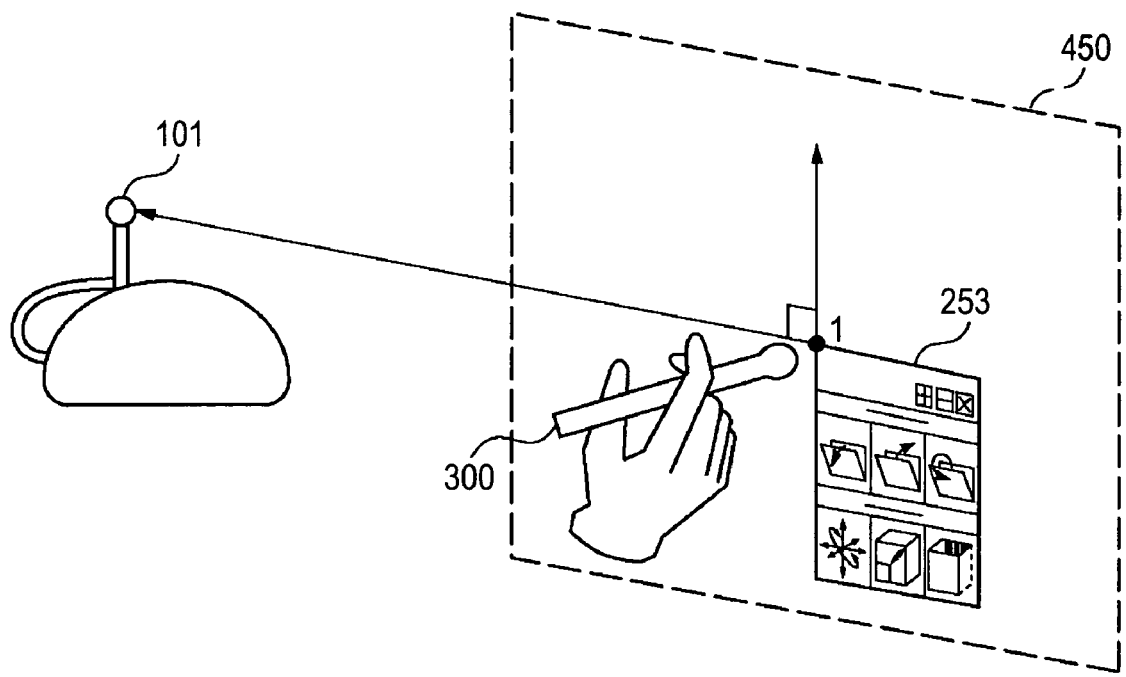
FIG. 4 illustrates an operation for moving the position of the operation panel using a pen input device.

FIG. 4 illustrates an operation of the pen input device 300 for moving the position of the operation panel 253 to a specified position and for disposing the operation panel 253 at the specified position.

For example, the observer moves the position of the pen input device 300 and presses the set button 302 at a position 1, as shown in FIG. 4.

In this case, the PC 200 disposes the operation panel 253 (or the duplicated operation panel) on a plane 450 that includes the position 1 (the position measured by the operation unit position and orientation sensor 301 when the set button 302 is pressed or the position obtained by adding the bias to the measured position) and that has a normal line vector connecting the position 1 and the position received from the head position and orientation sensor 101 when the set button 302 is pressed.

A portion of the operation panel 253 to be set at the position 1 is not particularly limited (in FIG. 4, the upper left corner of the operation panel 253 is set at the position 1). In addition, at this time, a vector representing an upward direction of the operation panel 253 is equal to a vector obtained by projecting a vector representing an upward direction of the HMD 100 onto the plane 450 on which the operation panel 253 is disposed. In addition, the operation panel 253 has a size determined in advance.

In addition, a plane that includes the position 1 and that has a normal line vector connecting the position 1 and the position obtained by adding the "position and orientation relationship between the head position and orientation sensor 101 and the camera 102" measured in advance to the position received from the head position and orientation sensor 101 when the set button 302 is pressed may be used as the plane 450. In this case, the operation face of the operation panel 253 faces toward the viewpoint. Thus, the operation panel 253 is more easily seen from the viewpoint of the observer.

Accordingly, the operation panel 253 can be disposed at a position designated by the pen input device 300 so as to be seen from the viewpoint of the observer.

After the operation panel 253 is disposed, when completion of disposition of the operation panel 253 is instructed, the disposition processing of the operation panel 253 is completed. The operation panel 253 is disposed at the designated position, as described above.

Completion of disposition of the operation panel 253 may be instructed, for example, by pressing the set button 302. Alternatively, the set button 302 may be disposed as a virtual object in the virtual space and completion of disposition of the operation panel 253 may be instructed using the pen input device 300, similarly to other buttons. In addition, the set button 302 may be pressed at a position separated by a predetermined distance from the disposed position (the position 1 in the example shown in FIG. 4) or the set button 302 may not be pressed over a predetermined time or more. In any case, when the CPU 801 of the PC 200 receives an instruction of completion of disposition of the operation panel 253, the disposition processing of the operation panel 253 is completed.

Here, if another position is designated by the pen input device 300 before receiving an instruction of completion of disposition of the operation panel 253, the size of the operation panel 253 is changed in accordance with the designated position.

Figure 5:
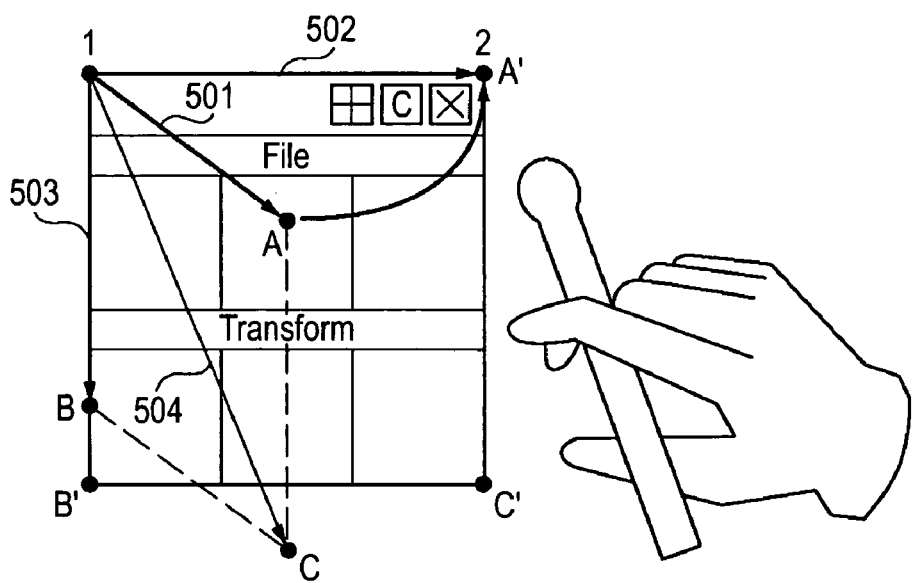
FIG. 5 illustrates an operation for changing the size of the operation panel using the pen input device.

FIG. 5 illustrates an operation of the pen input device 300 for changing the size of the operation panel 253. Here, four corners of the operation panel 253 before changing the size are defined as 1, B, C, and A. In this state, the pen input device 300 is moved to a position 2, as shown in FIG. 5, and the set button 302 is pressed. The PC 200 calculates a vector 501 connecting the position 1 to the position A (the upper right corner of the operation panel 253 before changing the size) and a vector 502 connecting the position 1 to the position 2. The PC 200 also calculates an angle $\alpha$ formed between the vectors 501 and 502, and a ratio $\beta$ of the sizes of the vectors 501 and 502. Then, the PC 200 calculates a vector 503 connecting the position 1 to the position B (the lower left corner of the operation panel 253 before changing the size) and a vector 504 connecting the position 1 to the position C (the lower right corner of the operation panel 253 before changing the size). The PC 200 also rotates the vectors 503 and 504 by the angle $\alpha$ and changes the sizes of the rotated vectors 503 and 504 by the ratio of $\beta$. In FIG. 5, the positions B' and C' are positions of the vectors 503 and 504 after rotation and size change by such processing.

Accordingly, the corners 1, B, C, and A of the operation panel 253 are changed to the corners 1, B', C', and A' by changing the size of the operation panel 253.

When an instruction for completing disposition of the operation panel 253 is input, the foregoing processing is completed.

Figure 6:
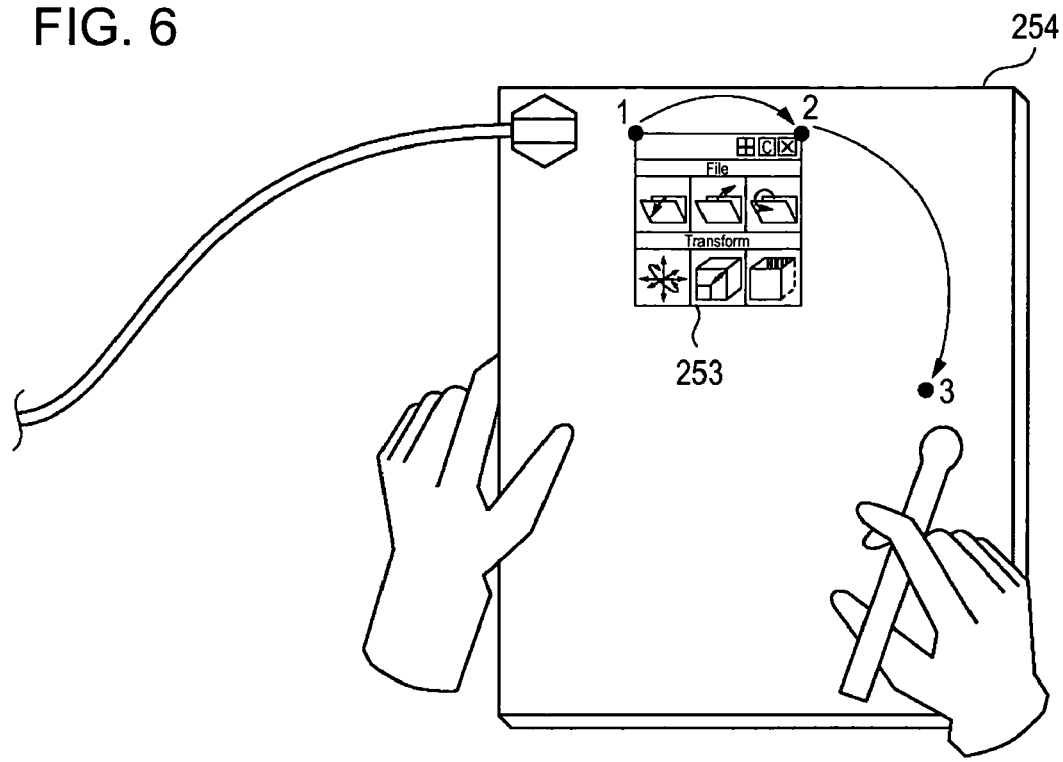
FIG. 6 shows a display example of the display unit of the operation panel disposed in a coordinate system defined by the position and the orientation of a tablet.

Furthermore, as shown in FIG. 6, when another position 3 is designated by the pen input device 300 before receiving an instruction of completion of disposition of the operation panel 253, the operation panel 253 is rotated based on a straight line connecting the positions 1 and 2 as a shaft such that the operation panel 253 is included in a plane including the designated position 3.

Accordingly, the operation panel 253 may be moved on the tablet 254, as shown in FIG. 6. In other words, if the operation panel 253 after movement is located within a predetermined range from the position measured by the tablet position and orientation sensor 400 (within a plane region of the tablet 254), the position and orientation of the operation panel 253 may be changed using a matrix representing the position and orientation measured by the tablet position and orientation sensor 400, and the operation panel 253 may be fixed on the tablet 254. In other words, the operation panel 253 is disposed in a coordinate system defined by the position and orientation measured by the tablet position and orientation sensor 400. Accordingly, when the observer holds the tablet 254 in one hand and changes the position and orientation of the tablet 254, the position and orientation of the operation panel 253 also changes so as to follow the change in the position and orientation of the tablet 254.

FIG. 6 shows a display example of the display unit 103 of the operation panel 253 disposed in the coordinate system defined by the position and orientation of the tablet 254.

Then, if the position of the operation panel 253 exceeds the predetermined range from the position measured by the tablet position and orientation sensor 400, the change in the position and orientation of the operation panel 253 using the matrix is not performed.

Figure 7:
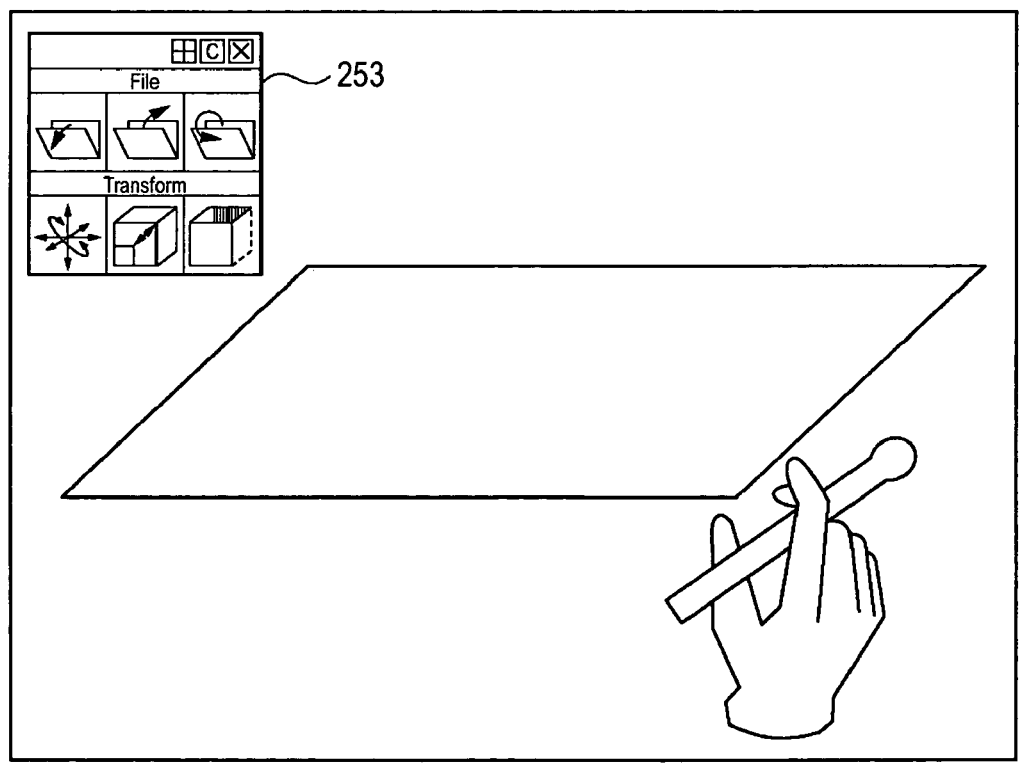
FIG. 7 shows a display example of the display unit of the operation panel disposed in a coordinate system defined by the position and the orientation of a camera.

In addition, when the disposed position of the operation panel 253 (the position 1) is close to the position of the HMD 100 (for example, when the distance between the position 1 and the camera 102 is less than 30 cm), the operation panel 253 may be disposed on a plane having a normal line in the line-of-sight direction of the camera 102 defined by the orientation component of the camera 102, as shown in FIG. 7. In other words, the operation panel 253 may be disposed in the coordinate system defined by the position and orientation of the camera 102.

FIG. 7 shows a display example of the display unit 103 of the operation panel 253 disposed in the coordinate system defined by the position and orientation of the camera 102.

Figure 9:
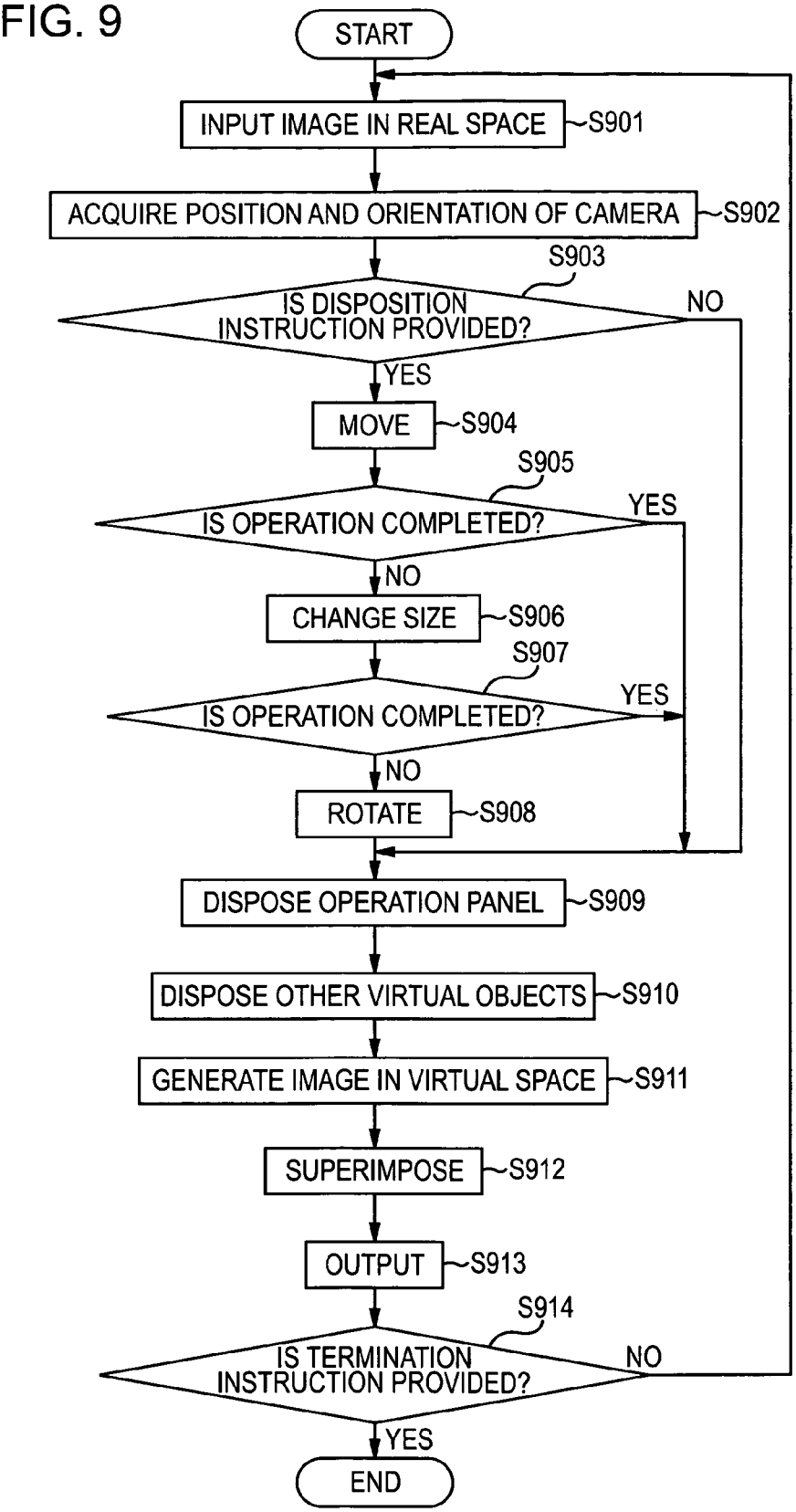
FIG. 9 is a flowchart showing a process performed by a central processing unit (CPU) of the PC for disposing the operation panel.

FIG. 9 is a flowchart of a process performed by the CPU 801 of the PC 200. This process is performed for disposing the operation panel 253 when an image obtained by synthesizing an image in a virtual space formed by virtual objects including the operation panel 253 and an image in a real space is provided to the display unit 103 of the HMD 100. A program and data for causing the CPU 801 to perform the process based on the flowchart in FIG. 9 are loaded to the RAM 802. The CPU 801 performs the process using the program and the data. Thus, the PC 200 performs the foregoing process.

An image in a real space captured by the camera 102 of the HMD 100 is input to the RAM 802 via the I/F 808, and this image is temporarily stored in the RAM 802 (step S901). The "position and orientation of the head position and orientation sensor 101 in a sensor coordinate system" measured by the head position and orientation sensor 101 is input to the RAM 802 via the I/F 808. Data representing the "position and orientation of the camera 102 in the coordinate system" is acquired by converting "data representing the position and orientation of the head position and orientation sensor 101 in the sensor coordinate system" using data representing the "position and orientation relationship between the head position and orientation sensor 101 and the camera 102" measured in advance, and the data representing the "position and orientation of the camera 102 in the sensor coordinate system" is temporarily recorded in the RAM 802 (step S902).

It is determined whether the move button 354 or the copy button 353 is designated (whether or not a disposition instruction is provided) in step S903. As described above, if the pen input device 300 is located within a display area of the move button 354 or the copy button 353 on the operation panel 253 and the set button 302 is pressed, it is determined that the move button 354 or the copy button 353 is designated.

If it is determined in step S903 that a disposition instruction is provided (i.e., the move button 354 or the copy button 353 is designated), the process proceeds to step S904. The operation panel 253 is moved to the position of the pen input device 300 when the set button 302 is pressed, as described above (step S904).

If it is determined in step S905 that completion of disposition is not reported via the I/F 809, the process proceeds to step S906. The size of the operation panel 253 is changed, as described above (step S906).

If it is determined in step S907 that completion of disposition is not reported via the I/F 809, the process proceeds to step S908. The operation panel 253 is rotated, as described above (step S908).

Then, the operation panel 253 controlled as described above is disposed and fixed in the designated position, in the designated direction, and with the designated size, (step S909). When it is determined in step S903 that no disposition instruction is provided, or if completion of disposition of the operation panel 253 is reported in step S905 or step S907, the process directly proceeds to step S909.

In addition, virtual objects other than the operation panel 253 are disposed in the virtual space (step S910). An image of the virtual objects (image in the virtual space) including the operation panel 253 seen from the camera 102 in the position and orientation calculated in step S902 is generated (step S911), the generated image is superimposed on the image in the real space input in advance to the RAM 802 (step S912), and the image obtained by the superimposition is output to the display unit 103 of the HMD 100 via the I/F 808 (step S913).

If it is determined in step S914 that an instruction for terminating the process is input using the keyboard 804 or the mouse 805, the process is terminated. If it is determined in step S914 that an instruction for terminating the process is not input, the process returns to step S901 and the processing shown in FIG. 9 is repeated.

As explained above, according to this embodiment, in an application in which an observer controls a virtual object in a virtual space using an operation panel, a reduction in the visibility of the virtual object can be prevented due to the use of the operation panel. In addition, even if the observer moves around, the position of the operation panel can be changed. Thus, the convenience of an operation menu can be enhanced.

Although a case where the pen input device 300 is used as a designation tool for controlling the operation panel 253 has been described, the pen input device 300 is not necessarily used. For example, the operation panel 253 may be controlled using an observer's finger. In this case, the operation unit position and orientation sensor 301 may be installed at the fingertip. Alternatively, the position of the fingertip may be determined by a known technology in accordance with an image in a real space captured by the camera 102 of the HMD 100, and it may be determined whether or not the determined position is within a display area of a button or an icon arranged on the operation panel 253, so that it can be determined whether or not the icon or the button is designated.

In addition, various mechanisms as well as the foregoing modifications may be applied to the present invention. In addition, although the foregoing system functions as an AR system, the foregoing system may function as a VR system.

In addition, although a case where the operation panel 253 is disposed by designating three pointing positions has been described, a method for disposing the operation panel 253 is not necessarily limited to this. For example, a disposed position of the operation panel 253 may be designated by a particular mark written on a plane by the pen input device 300. In addition, various disposition methods as well as the foregoing modifications may be applied to the present invention.

A case where the HMD 100 of a video see-through type is used has been described. In such case, an optical see-through HMD may be used. In this case, processing for inputting an image in a real space and for superimposing an image in a virtual space on the image in the real space can be omitted from the processing described above.

In addition, an aspect of the present invention may be achieved by supplying a recording medium (or a storage medium) on which program code (software) for realizing the functions of the foregoing embodiments is recorded to a system or an apparatus and by reading and executing the program code stored in the recording medium by a computer (or a CPU or a micro-processing unit (MPU)) of the system or the apparatus. In this case, the program code itself read from the recording medium attains functions of the foregoing embodiments.

In addition, the functions of the foregoing embodiments can be attained not only by performing the read program code by the computer but also by performing part or all of the actual processing by an OS or the like running on the computer on the basis of instructions of the program code.

Furthermore, the functions of the foregoing embodiments can also be attained by performing part or all of the actual processing by the CPU or the like arranged in a function expansion card of the computer or a function expansion unit connected to the computer on the basis of instructions of program code read from the recording medium after the program code is written in a memory of the function expansion card or the function expansion unit.

When this invention is applied to the recording medium, program code corresponding to the flowchart described above is stored in the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-314715 filed Oct. 28, 2004, which is hereby incorporated by reference herein in its entirety.

What is claimed is:

1. An image processing method for controlling an image processing apparatus using a display unit and presenting an image in a virtual space to an observer by displaying an image of virtual objects on a screen of the display unit, the image processing method comprising:
    a first input step of inputting a position and an orientation of a viewpoint of the observer;
    a second input step of inputting a position of a designation tool used by the observer;
    a disposing step of disposing an operation panel on a plane determined based on the position and the orientation of the viewpoint of the observer and the position of the designation tool;
    a generation step of generating an image of virtual objects including the operation panel viewed from the position and orientation of the viewpoint of the observer input in the first input step; and
    a displaying step of presenting the image of virtual objects including the operation panel to the observer by displaying the image of virtual objects on the screen of the display unit.

2. The image processing method according to claim 1, further comprising:
    a third input step of inputting an image in a real space viewed from the viewpoint of the observer; and
    an output step of generating a mixed image by superimposing the image generated by the generation step on the image input by the third input step and outputting the mixed image.

3. The image processing method according to claim 1, wherein the predetermined plane region is a face region of a tablet.

4. The image processing method according to claim 1, wherein, when the position of the operation panel disposed in the disposing step is located within a predetermined plane region, the operation panel is disposed in a coordinate system defined by a position and an orientation of the predetermined plane region.

5. The image processing method according to claim 1, wherein, when a distance between the position of the operation panel disposed in the disposing step and the position of the viewpoint input in the first input step is equal to or shorter than a predetermined distance, the operation panel is disposed in a coordinate system defined by the position and the orientation of the viewpoint input in the first input step.

6. An image processing apparatus using a display unit, for presenting an image in a virtual space to an observer by displaying an image of virtual objects on a screen of a display unit, the image processing apparatus comprising:
    a first input unit configured to input a position and an orientation of a viewpoint of the observer;
    a second input unit configured to input a position of a designation tool used by the observer;
    a disposing unit configured to dispose an operation panel on a plane determined based on the position and the orientation of the viewpoint of the observer and the position of the designation tool;
    a generation unit configured to generate an image of virtual objects including the operation panel viewed from the position and orientation of the viewpoint of the observer input via the first input unit; and
    a displaying unit configured to present the image of virtual objects including the operation panel to the observer by displaying the image of virtual objects on the screen of the display unit.

7. A computer-readable storage medium having computer-executable instructions stored thereon for causing an image processing apparatus using a display unit to perform an image processing method for presenting an image in a virtual space to an observer by displaying an image of virtual objects on a screen of the display unit comprising:
    a first input step of inputting a position and an orientation of a viewpoint of the observer;
    a second input step of inputting a position of a designation tool used by the observer;
    a disposing step of disposing an operation panel on a plane determined based on the position and the orientation of the viewpoint of the observer and the position of the designation tool;
    a generation step of generating an image of virtual objects including the operation panel viewed from the position and orientation of the viewpoint of the observer input in the first input step; and
    a display step of presenting the image of virtual objects including the operation panel to the observer by displaying the image of virtual objects on the screen of the display unit.

* * * * *